United States Patent
Glover et al.

(10) Patent No.: US 11,405,281 B2
(45) Date of Patent: Aug. 2, 2022

(54) DYNAMIC NETWORK ADAPTATION

(71) Applicant: BRITISH TELECOMMUNICATIONS PUBLIC LIMITED COMPANY, London (GB)

(72) Inventors: Timothy Glover, London (GB); Anthony Conway, London (GB); Carla Di Cairano-Gilfedder, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/733,654

(22) PCT Filed: Mar. 25, 2019

(86) PCT No.: PCT/EP2019/057474
§ 371 (c)(1),
(2) Date: Sep. 24, 2020

(87) PCT Pub. No.: WO2019/185561
PCT Pub. Date: Oct. 3, 2019

(65) Prior Publication Data
US 2021/0014123 A1 Jan. 14, 2021

(30) Foreign Application Priority Data
Mar. 25, 2018 (EP) .................... EP18163822

(51) Int. Cl.
*H04L 41/12* (2022.01)
*H04L 41/083* (2022.01)
(Continued)

(52) U.S. Cl.
CPC .......... *H04L 41/12* (2013.01); *H04L 12/4625* (2013.01); *H04L 12/4633* (2013.01);
(Continued)

(58) Field of Classification Search
CPC ... H04L 41/12; H04L 41/022; H04L 41/0836; H04L 45/22; H04L 45/02; H04L 45/28;
(Continued)

(56) References Cited

U.S. PATENT DOCUMENTS

| 6,078,946 A | 6/2000 | Johnson |
| 6,763,326 B1 | 7/2004 | Watkins et al. |

(Continued)

FOREIGN PATENT DOCUMENTS

| EP | 1324534 A1 | 7/2003 |
| EP | 2757739 A1 | 7/2014 |

(Continued)

OTHER PUBLICATIONS

Aria Networks, "Aria Networks shows the optimal path," retrieved from https://technologyinside.com/2007/04/26/aria-networks-shows-the-optimal-path/, on Sep. 1, 2020, 5 pages.
(Continued)

*Primary Examiner* — Kyung H Shin
(74) *Attorney, Agent, or Firm* — Patterson Thuente IP

(57) ABSTRACT

A computer implemented method of adapting a software defined network (SDN), the SDN operating with a set of network appliances in communication via network connections and the SDN comprising a control component operable in communication with at least a subset of the network appliances to control communication via the SDN, the method including receiving a representation of the logical arrangement of the SDN including a definition of appliances configured to provide communication for the SDN and network connections therebetween; receiving a measure of a performance metric for the SDN; receiving a forecast demand for the SDN; using a heuristic search to search a library of possible adaptations to the logical arrangement to identify a sequence of adaptations of the SDN that, when
(Continued)

implemented, satisfy the forecast demand for the SDN and provide an improved measure of the performance metric of the SDN; applying the identified sequence of adaptations to the SDN by modifying the logical arrangement for use by the control component in subsequent communication via the SDN.

9 Claims, 3 Drawing Sheets

(51) Int. Cl.
| | |
|---|---|
| H04L 41/142 | (2022.01) |
| H04L 41/14 | (2022.01) |
| H04L 45/64 | (2022.01) |
| H04L 45/42 | (2022.01) |
| H04L 45/02 | (2022.01) |
| H04L 41/022 | (2022.01) |
| H04L 45/00 | (2022.01) |
| H04L 45/50 | (2022.01) |
| H04L 45/302 | (2022.01) |
| H04L 12/46 | (2006.01) |

(52) U.S. Cl.
CPC .......... *H04L 41/022* (2013.01); *H04L 41/083* (2013.01); *H04L 41/142* (2013.01); *H04L 41/145* (2013.01); *H04L 45/02* (2013.01); *H04L 45/04* (2013.01); *H04L 45/22* (2013.01); *H04L 45/308* (2013.01); *H04L 45/42* (2013.01); *H04L 45/50* (2013.01); *H04L 45/64* (2013.01)

(58) Field of Classification Search
CPC . H04L 12/4625; H04L 12/4633; H04L 45/04; H04L 45/00; H04L 45/308; H04L 45/50; H04L 45/64; H04L 45/42; H04L 45/56; H04L 47/2425; H04L 43/0852; H04L 43/0811
See application file for complete search history.

(56) References Cited

U.S. PATENT DOCUMENTS

| | | | | |
|---|---|---|---|---|
| 8,442,030 | B2* | 5/2013 | Dennison | ............ H04L 12/4625 370/351 |
| 8,750,161 | B1 | 6/2014 | Matthews et al. | |
| 8,812,279 | B2 | 8/2014 | Perrett | |
| 10,191,769 | B2 | 1/2019 | Azvine et al. | |
| 2009/0003217 | A1 | 1/2009 | Ferra et al. | |
| 2015/0043915 | A1 | 2/2015 | Patel et al. | |
| 2015/0052243 | A1 | 2/2015 | Lumezanu et al. | |
| 2016/0150421 | A1 | 5/2016 | Li et al. | |
| 2016/0226701 | A1* | 8/2016 | Luo | ........................ H04L 41/12 |
| 2016/0239660 | A1 | 8/2016 | Azvine et al. | |
| 2017/0054607 | A1 | 2/2017 | Madaiah et al. | |
| 2017/0195171 | A1 | 7/2017 | Wohlert et al. | |
| 2018/0075038 | A1 | 3/2018 | Azvine et al. | |
| 2020/0065692 | A1 | 2/2020 | Azvine et al. | |

FOREIGN PATENT DOCUMENTS

| | | |
|---|---|---|
| WO | WO-2014047073 A1 | 3/2014 |
| WO | WO-2015099701 A1 | 7/2015 |
| WO | WO-2018000240 A1 | 1/2018 |

OTHER PUBLICATIONS

Dale M J., "Fast MPLS Network Optimisation using Machine Learning," Downloaded on Sep. 1, 2020, 6 pages.
Extended European Search Report for Application No. 18163822.2, dated Sep. 24, 2018, 8 pages.
GB Combined Search and Examination Report for GB Application No. GB1804778.7 dated Aug. 17, 2018, 5 pages.
International Search Report and Written Opinion for Application No. PCT/EP2019/057474 dated Nov. 4, 2019, 10 pages.
Kalmbach M H P., "Algorithm-Data Driven Optimization of adaptive Communication Networks," 2017, 6 pages.
Badotra S., et al., "Open Daylight as a Controller for Software Defined Networking," IJARCS, Retrieved from https://www.researchgate.net/publication/319547264_Open_Daylight_as_a_Controller_for_Software_Defined_Networking, vol. 8, No. 5, May-Jun. 2017, pp. 1105-1111.
Combined Search and Examination Report under Sections 17 and 18(3) for Great Britain Application No. 2002871.8, dated Aug. 7, 2020, 6 pages.
Combined Search and Examination Report under Sections 17 and 18(3) for Great Britain Application No. 1902918.0, dated Aug. 27, 2019, 5 pages.
Doriedson A., et al., "Combining Metrics for Route Selection in SDWSN: Static and Dynamic Approaches Evaluation," IEEE 10th Latin-American Conference on Communications (LATINCOM), 2018, 6 pages.
Erickson D., "The Beacon OpenFlow Controller," HotSDN'13, Retrieved from http://yuba.stanford.edu/~derickso/docs/hotsdn15-erickson.pdf, Aug. 16, 2013, 6 pages.
Extended European Search Report for Application No. 19160663.1, dated Jul. 16, 2019, 11 pages.
Moravejosharieh A., et al., "A Fuzzy Logic Approach To Increase Quality of Service in Software Defined Networking," IEEE, International Conference on Advances in Computing, Communication Control and Networking, 2018, pp. 68-73.
Springer, "Handbook of Optimization in Telecommunications," 2006, 30 pages.

* cited by examiner

DYNAMIC NETWORK ADAPTATION

PRIORITY CLAIM

The present application is a National Phase entry of PCT Application No. PCT/EP2019/057474, filed 25 Mar. 2019, which claims priority from European Patent Application No. 18163822.2, filed 25 Mar. 2018, each of which is hereby fully incorporated herein by reference.

TECHNICAL FIELD

The present disclosure relates to methods, systems and computer program products providing adaptive computer networks.

BACKGROUND

A computer network is designed before it is deployed and can include network elements such as network appliances and connections therebetween. The design of network topologies is typically a manual process and subject to trial and error. It is therefore desirable to automate the network design process to achieve performance improvement and to satisfy other network performance requirements.

SUMMARY

The present disclosure accordingly provides, in a first aspect, a computer implemented method of adapting a software defined network (SDN), the SDN operating with a set of network appliances in communication via network connections and the SDN comprising a control component operable in communication with at least a subset of the network appliances to control communication via the SDN, the method comprising: receiving a representation of the logical arrangement of the SDN including a definition of appliances configured to provide communication for the SDN and network connections therebetween; receiving a measure of a performance metric for the SDN; receiving a forecast demand for the SDN; using a heuristic search to search a library of possible adaptations to the logical arrangement to identify a sequence of adaptations of the SDN that, when implemented, satisfy the forecast demand for the SDN and provide an improved measure of the performance metric of the SDN; applying the identified sequence of adaptations to the SDN by modifying the logical arrangement for use by the control component in subsequent communication via the SDN.

In some embodiments, the received measure of the performance metric corresponds to a point in time of operation of the SDN, and the received forecast demand corresponds to a time window commencing at the point in time, wherein the identified sequence of adaptations are applied for the subsequent time window.

In some embodiments, the searching step is terminated according to a predetermined stopping condition.

In some embodiments, the stopping condition is determined as a time within the time window determined such that sufficient time in the time window is available for applying the identified sequence of adaptations to the SDN before the subsequent time window.

In some embodiments, the heuristic search includes one or more of: simulated annealing; hill climbing; and guided local search, so as to iteratively converge on the sequence of adaptations.

In some embodiments, the receiving, searching and applying steps are repeated for multiple time windows.

In some embodiments, the performance metric includes one or more of: a number of network elements; a number of network appliances; a number of network connections; a length of network connections between two or more appliances; a total length of network connections in the network design; a forecast throughput of the SDN between two or more appliances; and a forecast transfer rate of the network between two or more appliances.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

Figure 1:
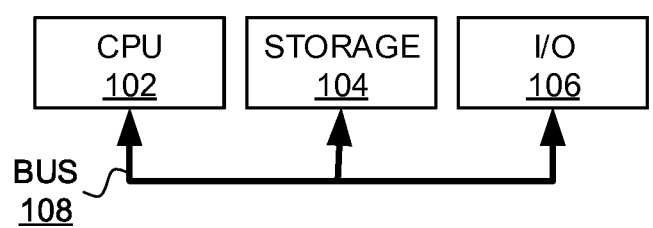
FIG. 1 is a block diagram a computer system suitable for the operation of embodiments of the present disclosure.

Embodiments of the present disclosure provide efficient techniques for the automatic definition of topologies for a computer network including network appliances and connections therebetween. For example, network appliances can include gateways, routers, switches, bridges, repeaters, hubs, access points, network storage appliances, network security appliances, aggregators, multiplexors, protocol converters, servers, network address translators, network interface controllers, wireless network interfaces, modems, terminal adapters, line drivers and other appliances as will be apparent to those skilled in the art. Network connections can include wired, wireless or hybrid communication means.

Network design includes a specification of a configuration of individual appliances, at least some of which may be installed, configured or utilised in multiple ways. For example, generalised appliances may provide multiple functions and/or services such as routing, switching and wireless access within a single device.

Network topology design involves specifying the physical and/or logical arrangement of network appliances and the communications links therebetween to satisfy a network requirement. Furthermore, performance metrics can used to define a required or preferred performance of the network and to optimise the network. Performance metrics can include: a number of appliances; a resource consumption of appliances; a number of network connections; a length of network connections between two or more appliances; a total length of all network connections; a throughput between two points in the network; a throughput between multiple points in the network; a signal to noise ratio in the network; and transfer rates within and/or across the network.

Embodiments of the present disclosure are applicable to software defined networks (SDNs) in which a physical network plane is complemented by logical network plane under the management of a network controller. An SDN is a known network architecture having a logically separate physical network plane and a control logical network plane under the management of a network controller. The controller provides network control services such as routing and connection information for network appliances, while deployed network appliances and communications links provide actual data communication. In particular, embodiments of the present invention address the challenge of runtime optimisation of an SDN design by designating, re-designating or de-designating network resources at runtime according to performance criteria such as those described above.

In embodiments of the present disclosure, a library of adaptations that may be implemented for an SDN design is searched using heuristic search techniques. For example, the library may contain adaptations relating to the designation of a new network resource for inclusion in the SDN, the re-designation of an existing network resource or the de-designation of an existing network resource. Such designation may include, for example, the adoption of a network appliance as a switch following switching rules provided by the controller in the SDN. The heuristic search operates on the basis of one or more performance metrics for which maintenance or improvement is required in the SDN such that each adaptation selected from the library serves to deliver an improvement in the performance dimension(s) required. Accordingly, the heuristic search suitably employs a simulated annealing, hill climbing or guided local search. Other suitable mechanisms for achieving heuristic search will be apparent to those skilled in the art.

In some embodiments, machine learning is employed to approximate a function for identifying a most effective adaptation in the library such that the function, operating on a representation of the features of an SDN including reflecting the SDN topology and performance characteristics, identifies a next most appropriate adaptation from the library. Such a machine learning algorithm can, for example, adapt probability distribution(s) associated with each adaptation to reflect the utility of the adaptation to deliver a requisite performance improvement for an SDN exhibiting a particular feature set.

Identified adaptations can be applied to the SDN by modifying the SDN design at runtime such that a modified design can be implemented by the controller. Accordingly, real-time adjustment of the SDN is provided to deliver improved performance in required metrics.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
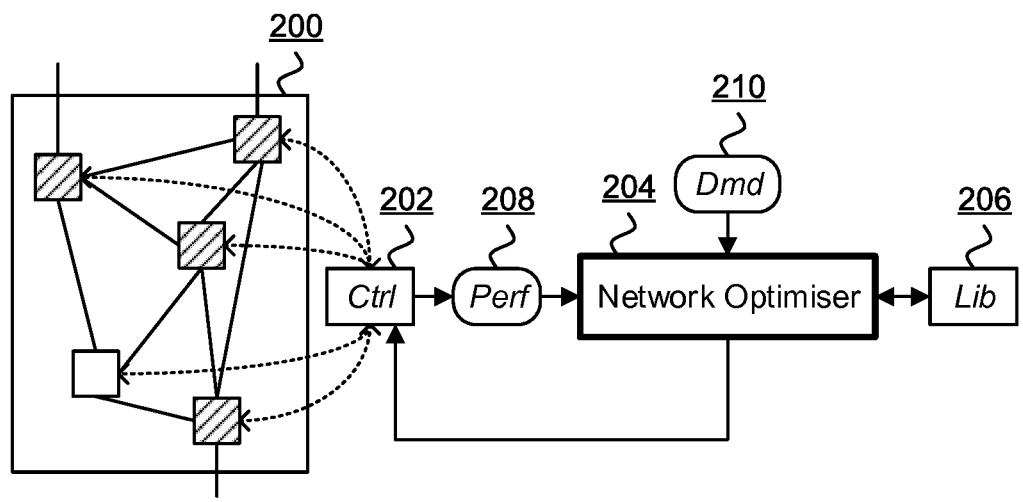
FIG. 2 is a component diagram of a software defined network (SDN) adapted by a network optimiser in accordance with embodiments of the present disclosure.

FIG. 2 is a component diagram of a SDN 200 adapted by a network optimiser 204 in accordance with embodiments of the present disclosure. The exemplary SDN 200 is illustrated comprising a set of network appliances with network connections therebetween of which some are designated for use in the SDN 200 (indicated as cross hatched). The SDN 200 is controlled by the SDN controller 202 as a hardware, software, firmware or combination component in communication with the network appliances in the SDN 200. The communication between the controller 202 and the SDN appliances can be via the physical network(s) constituting the SDN 200 or via a separate network such as a wired or wireless alternative network connection. Thus, the SDN 200 constitutes a logical arrangement of network appliances and connections therebetween for constituting a dynamic network across and/or through which network communication can be made by communicating endpoints (not shown). The SDN 200 is dynamic in the sense that the appliances designated for application in the SDN 200, the configuration and performance of those appliances, and the network links therebetween employed for the SDN 200 are all defined by, with or in conjunction with the controller 202 and may be changed in use. Thus, changes to capacity requirements, resource consumption, throughput and other performance characteristics can be effected by reconfiguring the SDN 200 in-use.

A network optimizer 204 is provided for implementing the runtime adaptation of the SDN 200. The network optimizer 204 is a hardware, software, firmware or combination component in communication with the controller 202 that provides a sequence of adaptations of the SDN 200 for application to the SDN 200 by, for example, the controller 202. The adaptations determined by the optimiser 204 serve to adapt the logical arrangement of the SDN 200 to provide an improvement to a required performance metric of the SDN 200 and to provide sufficient capacity and/or capability to meet demands that will be placed on the SDN 200.

Accordingly, the network optimizer 204 receives forecast demand information 210 indicating the demand for network resource that is expected to be placed on the SDN 200 in a particular time period. Such demand can include: a required throughput; required data transmission rates; required connection counts; a number of communicating endpoints; a frequency of communications; and other demand characteristics as will be apparent to those skilled in the art. The forecast demand 210 can be provided from a manual process or can be estimated, learned or predicted by automated means beyond the scope of this specification.

Further, the network optimizer 204 receives performance information from the SDN 200 a measure of one or more performance metrics 208, such as measures of the performance metrics described above. Thus, a current performance of the SDN 200 is received by the network optimizer 204, a forecast demand is received by the optimizer 204 and the optimizer 204 is operable to select adaptations for application to the SDN 200 to, when implemented, satisfy the forecast demand 210 and provide an improvement in the measure of the performance metric 208.

In this regard, the network optimizer 204 accesses a library 206 of adaptations as previously described. The library of adaptations contains adaptations that can be implemented to the SDN 200—some of which may improve a measure of the performance metric 208 and some of which may reduce such performance. Similarly, some adaptations may contribute towards satisfying the forecast demand 210 and other adaptations may not. Thus, the network optimizer 204 is operable to select, from the library of possible adaptations to the logical arrangement of the SDN 200, a sequence of adaptations of the SDN that, when implemented, satisfy the forecast demand 210 and provide an improved measure of the performance metric 208.

The optimizer 204 searches the library 206 using heuristic search techniques. For example, the library may contain adaptations relating to the designation of a new network resource for inclusion in the SDN, the re-designation of an existing network resource or the de-designation of an existing network resource. Such designation may include, for example, the adoption of a network appliance as a switch following switching rules provided by the controller in the SDN. Accordingly, the heuristic search suitably employs a simulated annealing, hill climbing or guided local search. Other suitable mechanisms for achieving heuristic search will be apparent to those skilled in the art. Subsequently, a sequence of adaptations identified by the optimizer 204 is applied to the SDN 200 by modifying the logical arrangement of the SDN 200 by way of the controller 202.

In some embodiments, the approach of the optimiser 204 is undertaken repeatedly over a period of time such that improvements to the SDN 200 are implemented progressively. Accordingly, in such embodiments, the measure of performance 208 of the SDN 200 corresponds to a point in time of operation of the SDN 200 and the received forecast demand 210 corresponds to a time window commencing at the point in time. Thus, in such embodiments, a sequence of adaptations identified by the optimiser 204 is applied to the SDN 200 for a subsequent time window.

In such embodiments, the identification of multiple adaptations by the optimizer 204 can be undertaken iteratively during the time window, such iteration being arranged to terminate when a stopping condition is reached. Such a stopping condition can include, for example, a time within the time window determined such that sufficient time in the time window is available for applying the identified sequence of adaptations to the SDN 200 before the subsequent time window commences. Thus, the iterative approach of the network optimizer 204 can be repeated for multiple time windows.

Figure 3:
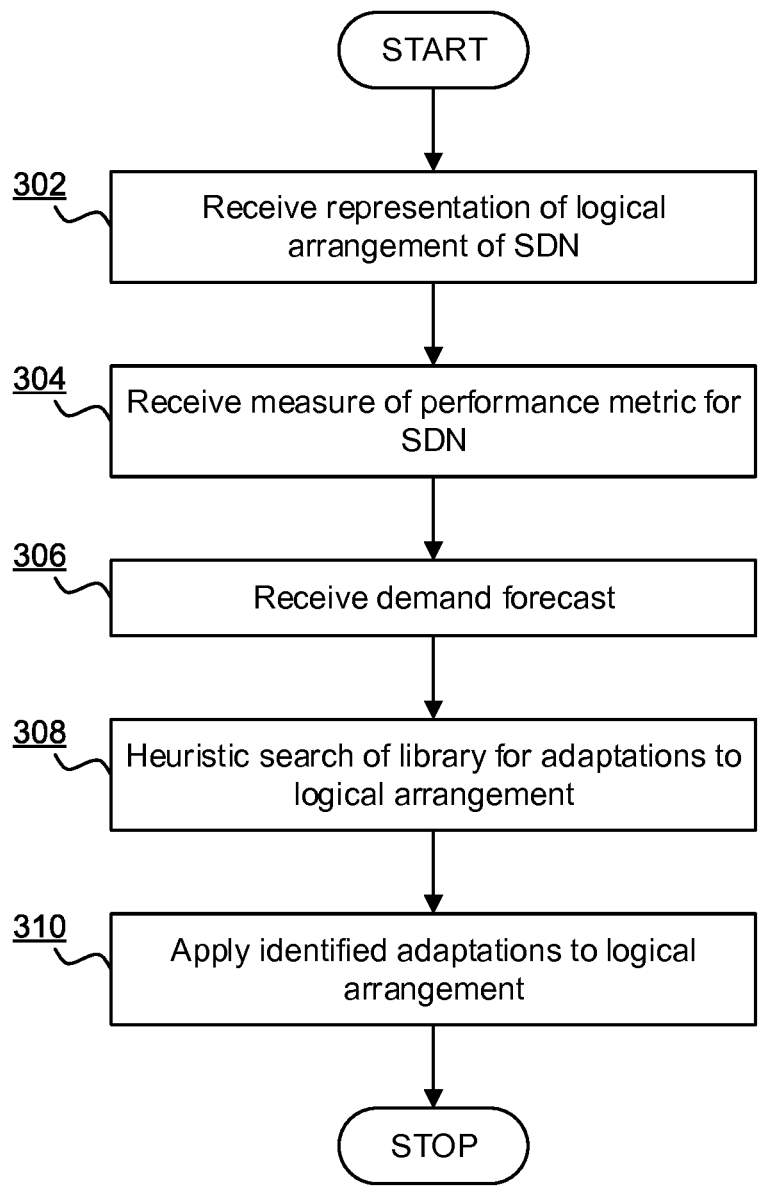
FIG. 3 is a flowchart of a method of adapting a SDN in accordance with embodiments of the present disclosure.

FIG. 3 is a flowchart of a method of adapting a SDN in accordance with embodiments of the present disclosure. Initially, at 302, a representation of a logical arrangement of the SDN 200 is receive or otherwise accessed. At 304 the measure of performance metric(s) 208 is received. At 306 the demand forecast 210 is received. At 308 the network optimiser 204 employs heuristic search to identify a sequence of adaptations to the logical arrangement of the SDN 200. At 310 the sequence of adaptations is applied to the SDN 200.

Alternative embodiments of the present disclosure will now be described for the configuration of a new network that may not be implemented as an SDN. Such a network comprises a plurality of network elements including network appliances and connections therebetween as previously described, and further the network must satisfy a network specification defining required network elements. In particular, such a network is for implementation in a particular environment, such as a geographic area, and the required network elements each has a specified location in the environment.

Thus, according to such embodiments, a representation of a plan of the environment is provided such as a digital map or the like, that may be an image file, including a definition of environmental features. Such environmental features can include features that preclude the placement, location or inclusion of one or more network elements such as, for example, geographic features that preclude the placement of a network connection such as a cable, wire or similar, or geographic features that preclude the placement of a network appliance.

Embodiments of the disclosure are arranged to define a network layout for the network, the network layout specifying the location in the environment of network elements and connections therebetween, being constrained by the features in the environment plan and satisfying the requirements of the network specification. The network layout as initially defined is subsequently adapted based on a forecast performance of the network layout and a forecast demand of the network, such adaptation being based on a library of adaptations that is searched using heuristic search techniques as previously described.

Figure 4:
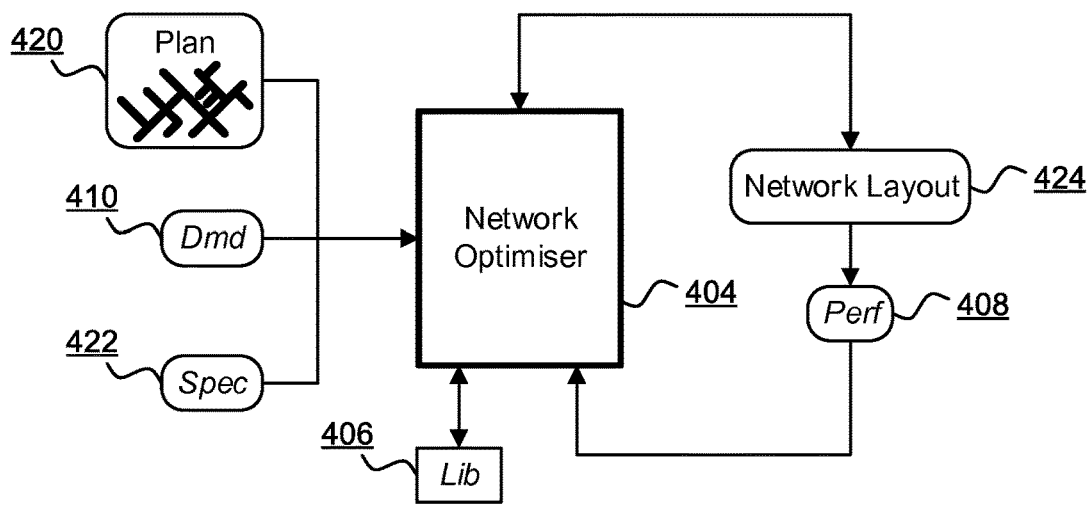
FIG. 4 is a component diagram of a network optimiser for defining a network layout in accordance with embodiments of the present disclosure.

FIG. 4 is a component diagram of a network optimizer 404 for defining a network layout 424 in accordance with embodiments of the present disclosure. A plan 420 is received by the optimizer 404 as a digital representation of an environment in which the proposed network is to be deployed. Such a plan can be provided as a digital image file having features recognisable or identifiable by an image processing method such as feature recognition technology as is known in the art. Such features include features indicating locations in the environment where network elements are precluded. Furthermore, the optimizer 404 receives a specification 422 for the proposed network, such as a specification of one or more network elements that must be provided at one or more locations in the environment. For example, a proposed new telecommunications network providing a fiber-to-the-premises (FTTP) service may include a specification 422 of the premises in a geographic area (the environment) at which the network access points must be provided.

The network optimizer 404 generates an initial network layout 424 including a definition of network elements and their locations in the environment based on the plan 420. The initial network layout 424 is defined only to satisfy the constraints of the environmental plan 420 (such as the precluded locations) and the requirements of the network specification 422. Thus, in some embodiments, the initial network layout 424 can be provided by an external entity such as a network planner or designer.

Subsequently, the network optimizer 404 determines adaptations to the network layout 424, the adaptations being selected from a library 406 of possible adaptations and being selected based on a forecast demand 410 and a forecast performance 408 of the network layout 424. The forecast demand 410 for a network deployed in accordance with the network layout 424 is substantially as hereinbefore described. The forecast performance 408 cannot be measures, as previously described with reference to FIG. 2, since a network in accordance with the layout 424 is not yet deployed. Rather, the performance 408 must be forecast by a forecasting methodology using, for example, a directory of known network elements, their known or configurable performance characteristics (e.g. throughput, data rate, resource consumption, etc.), environmental factors from the plan 420 based on network element placement according the layout 424 (e.g. length of line, interference, number of connections) and determines a prediction of performance to constitute the measure of a performance metric 408. For example, the prediction can be arrived at using a simulation mechanism such as a software model of a network according to the layout 424 put under simulated load in accordance with the forecast demand 410.

The adaptations are selected by the network optimiser 404 from the library 406 using a heuristic search technique as previously described. On selection of adaptations, the adaptations are applied to the network layout 424 by modifying the layout in accordance with the adaptations. This mechanism can be repeated to progressively improve the network layout 424 to exhibit improved forecast performance 408 within the constraints of the plan 420 and the requirements of the network specification 422.

Thus, the network optimizer 404 can iterate to progressively improve the network layout 424. The iteration of the network optimizer 404 can be terminated based on a threshold measure of the performance metric 408 such that, when the threshold performance is reached, the network layout 424 is finalised for implementation and deployment.

Figure 5:
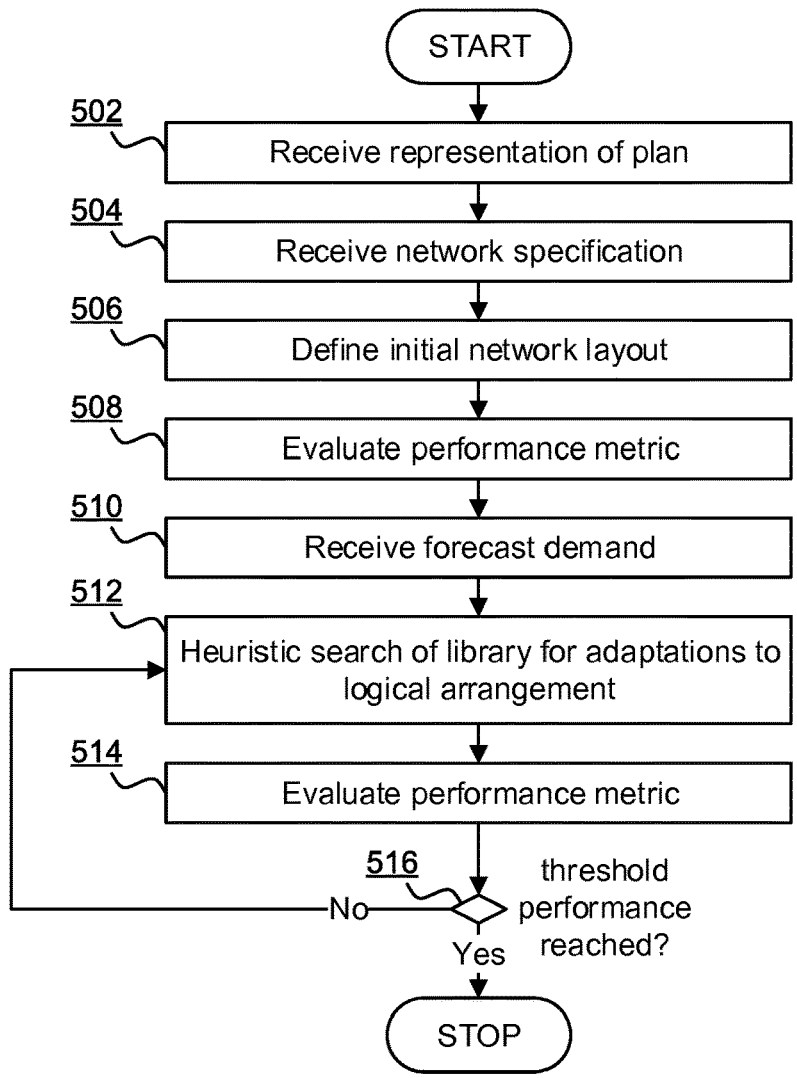
FIG. 5 is a flowchart of a method of configuring a computer network in accordance with embodiments of the present disclosure.

FIG. 5 is a flowchart of a method of configuring a computer network in accordance with embodiments of the present disclosure. Initially, at 502, the optimizer 404 receives a representation of the plan 420 of an environment in which the network is to be deployed. At 504 the method receives the network specification 422. At 506 the method defines an initial network layout 424 constrained by the plan 420 and satisfying the network specification 422. Alternatively, the initial network layout may be received from an external entity. At [[step]] 508 the method evaluates a forecast measure of a performance metric 408. At 510 the method receives the forecast demand 410. At 512 the method employs heuristic search of the library of adaptations 406 to identify a sequence of adaptations of the layout 424 that, when implemented, satisfy the forecast demand 410 and provide an improved forecast measure of the performance metric of the layout 424, while satisfying the network specification 422 within the constraints of the plan 420. The method then evaluates a new forecast performance metric for the network layout 424 adapted according to the identified sequence of adaptations at 514. At 516 the method iterates until the forecast performance reaches the threshold performance.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure. The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of adapting a software defined network (SDN), the SDN operating with a set of network appliances in communication via network connections and the SDN comprising a control component operable in communication with at least a subset of the set of network appliances to control communication via the SDN, the method comprising:
receiving a representation of a logical arrangement of the SDN including a definition of appliances configured to provide communication for the SDN and network connections therebetween;
receiving a measure of a performance metric for the SDN;
receiving a forecast demand for the SDN;
using a heuristic search to search a library of possible adaptations to the logical arrangement of the SDN to identify a sequence of adaptations of the SDN that, when implemented, satisfy the forecast demand for the SDN and provide an improved measure of the performance metric of the SDN, the library of possible adaptations including adaptations of re-designation or de-designation of an existing network resource; and
applying the identified sequence of adaptations to the SDN at runtime by modifying the logical arrangement of the SDN for use by the control component in subsequent communication via the SDN.

2. The method of claim 1, wherein the received measure of the performance metric corresponds to a point in time of operation of the SDN, and the received forecast demand corresponds to a first time window commencing at the point in time, wherein the identified sequence of adaptations are applied for a subsequent time window.

3. The method of claim 2, wherein searching the library is terminated according to a predetermined stopping condition.

4. The method of claim 3, wherein the predetermined stopping condition is determined as a time within the first time window determined such that sufficient time in the first time window is available for applying the identified sequence of adaptations to the SDN before the subsequent time window.

5. The method of claim 1, wherein the heuristic search includes one or more of: simulated annealing; hill climbing; or guided local search, so as to iteratively converge on the sequence of adaptations.

6. The method of claim 1, wherein the receiving, the searching, and the applying are repeated for multiple time windows.

7. The method of claim 1, wherein the performance metric includes one or more of: a number of network elements; a number of network appliances; a number of network connections; a length of network connections between two or more network appliances; a total length of network connections in a design of the SDN; a forecast throughput of the SDN between two or more network appliances; or a forecast transfer rate of the network between two or more network appliances.

8. A computer system comprising:

a processor and memory storing computer program code for adapting a software defined network (SDN), the SDN operating with a set of network appliances in communication via network connections and the SDN comprising a control component operable in communication with at least a subset of the set of network appliances to control communication via the SDN, by:

receiving a representation of a logical arrangement of the SDN including a definition of appliances configured to provide communication for the SDN and network connections therebetween;

receiving a measure of a performance metric for the SDN;

receiving a forecast demand for the SDN;

using a heuristic search to search a library of possible adaptations to the logical arrangement of the SDN to identify a sequence of adaptations of the SDN that, when implemented, satisfy the forecast demand for the SDN and provide an improved measure of the performance metric of the SDN, the library of possible adaptations including adaptations of re-designation or de-designation of an existing network resource; and applying the identified sequence of adaptations to the SDN at runtime by modifying the logical arrangement of the SDN for use by the control component in subsequent communication via the SDN.

9. A non-transitory computer-readable storage medium storing a computer program element comprising computer program code to, when loaded into a computer system and executed thereon, cause the computer system to perform the method as claimed in claim 1.

* * * * *